United States Patent
Schrenk (10) Patent No.: US 7,315,833 B2
(45) Date of Patent: Jan. 1, 2008

(54) GRAPHICAL INTERNET SEARCH SYSTEM AND METHODS

(75) Inventor: Roger A. Schrenk, Arlington, VA (US)

(73) Assignee: Rosetta Holdings, LLC, Alexandria, VA (US)

( * ) Notice: Subject to any disclaimer, the term of this patent is extended or adjusted under 35 U.S.C. 154(b) by 559 days.

(21) Appl. No.: 10/758,072

(22) Filed: Jan. 16, 2004

(65) Prior Publication Data

US 2004/0177009 A1 Sep. 9, 2004

Related U.S. Application Data

(60) Provisional application No. 60/440,324, filed on Jan. 16, 2003.

(51) Int. Cl.
*G06Q 30/00* (2006.01)

(52) U.S. Cl. ........................................ 705/26

(58) Field of Classification Search ................. 705/26, 705/27
See application file for complete search history.

(56) References Cited

U.S. PATENT DOCUMENTS

| | | | |
|---|---|---|---|
| 5,751,286 A | 5/1998 | Barber et al. | |
| 5,845,288 A | 12/1998 | Syeda-Mahmood | |
| 5,873,080 A * | 2/1999 | Coden et al. | ............. 707/3 |
| 5,920,856 A | 7/1999 | Syeda | |
| 5,943,435 A | 8/1999 | Gaborski | |
| 6,026,409 A | 2/2000 | Blumenthal | |
| 6,256,409 B1 | 7/2001 | Wang | |
| 6,268,854 B1 | 7/2001 | Borden et al. | |
| 6,269,358 B1 | 7/2001 | Hirata et al. | |
| 6,329,994 B1 | 12/2001 | Gever et al. | |
| 6,345,274 B1 | 2/2002 | Zhu et al. | |
| 6,349,296 B1 | 2/2002 | Broder et al. | |
| 6,360,216 B1 | 3/2002 | Hennessey et al. | |
| 6,381,510 B1 | 4/2002 | Amidhozour et al. | |
| 6,446,060 B1 | 9/2002 | Bergman et al. | |
| 6,512,850 B2 | 1/2003 | Yaung | |
| 6,678,411 B1 | 1/2004 | Crill | |
| 2002/0032677 A1 | 3/2002 | Mogenthaler et al. | |
| 2003/0063779 A1 | 4/2003 | Wrigley | |
| 2004/0019528 A1 * | 1/2004 | Broussard et al. | ............. 705/26 |
| 2004/0113945 A1 * | 6/2004 | Park et al. | ................... 345/765 |
| 2004/0199623 A1 * | 10/2004 | Houri | ......................... 709/223 |

FOREIGN PATENT DOCUMENTS

WO  WO 01/93156 A1 *  6/2001

OTHER PUBLICATIONS

Baxter et al. "Image indexing and retrieval: some problems and proposed solutions", Internet Research, v6n4 pp. 67-76, 1996. Retrieved from Dialog File: 15, Acc#: 02370027.*

(Continued)

*Primary Examiner*—Naeem Haq
(74) *Attorney, Agent, or Firm*—Mark A. Wurm (57) ABSTRACT

A system and methods for web based graphical internet searching for locating unique items sought by buyers of designs, furnishings and accessories through use of the internet. The invention includes a search interface where both a seller and buyer will use the same graphical alphabet, which divides an item into its component parts, to decipher the language of design which has an infinite number of stylistic combinations.

21 Claims, 12 Drawing Sheets

OTHER PUBLICATIONS

Page 2 of www.findfurniture.com.

Ditto's visual search at www.ditto.com.

Ogle et al. "Chabot: Retrieval from a Relational Database of Images", IEEE Sep. 1995, pp. 40-48.

Pentland et al. "Photobook: content-Based Manipulation of Image Databases", M.I.T. Media Laboratory Perceptual Computing Technical Report No. 225, Nov. 1993.

Charles Frankel et al. "Webseer: An Image Search Engine for the World Wide Web", University of Chicago, Technical Report 96-14, Aug. 1, 1996.

John R. smith et al. "VisualSEEk: a fully automated content-based image query system", Nov. 20, 1996.

Neil F. Johnson "In Search of the Right Image: Recognition and Tracking of Images in Image Databases, Collections, and the Internet", Center for Secure Information Systems, George Mason University, 1999.

Neumann et al. "Visual Image Query", International Symposium on smart Graphics, Jun. 13, 2002.

* cited by examiner

IDODA Home Page View- Second search occurs while still on home page

IDODA Administrative Reporting

GRAPHICAL INTERNET SEARCH SYSTEM AND METHODS

CROSS-REFERENCE TO RELATED APPLICATIONS

This application claims the benefit of U.S. Provisional Patent Application No. 60/440,324, filed Jan. 16, 2003, entitled "Web Based Interface for Graphical Internet Searching" by Roger A. Schrenk. The teachings of the provisional patent application are incorporated herein by reference in their entirety.

FIELD OF THE INVENTION

The invention relates to an online marketplace for uniquely designed items, and more particularly, to a web based interface for graphical internet searching that allows buyers and sellers to communicate with one another through the use of images rather than text.

BACKGROUND OF THE INVENTION

Currently all search techniques on the internet require people to type in words or phrases to describe what they want to buy or sell. While this model is efficient for standardized goods such as books, cars, CDs and machine parts that require nothing more than a model number, quantity or price to exchange, such a model is inefficient for complex goods like furniture and textiles for instance, whose descriptions can vary from person to person. There is currently no way on the Internet for an individual to search for what they want without the use of text as the primary search tool.

Consider if two people were asked to write a description of a chair, it is unlikely that their descriptions would match. Why? Because the terms and phrases needed to describe the chair accurately belong to a very complex stylistic language that is unfamiliar to the majority of the population. Stylistically this chair can be called Victorian, Renaissance Revival or Greek Revival. Its form can be called a side chair, a parlor chair, a lady's chair or even a slipper chair depending on its height. A similar range of options exists for the possible materials used in the chair and for its condition. The general public cannot be expected to know all the stylistic terms associated with this chair. Nevertheless, current search models on the internet offer no alternative to the use of text. They simply assume that both buyer and seller are using the same vocabulary when searching for highly complex items, but they're not.

The logical alternative to the use of text is that of images. If two people were given a picture of the chair discussed above and then were told to find that chair among many similar but different chairs in the same room, they would likely choose the same chair. Why? Because people can match complex items a lot quicker with a picture than with a written description. By comparison, if the same two people were placed in a room having many different chairs and were told to find the one that was Renaissance Revival, their ability to choose the correct chair would depend on their knowledge of furniture styles, not on their natural ability to identify similar images.

Current online models have their limitations such as auctions. Online auctions have drawn a lot of attention recently due to the incredible success of Ebay.com, a multi-billion dollar company based in San Jose, Calif. Ebay provides a space for buyers and sellers to bid on millions of items which are divided into one of several categories such as antiques, metalware, pottery and textiles etc. Buyers find sellers by entering "keywords" or phrases that match descriptions given to the items by the sellers. Buyers are allowed to bid on the items electronically for up to 10 days at which time the bidding ends and the item is awarded to the highest bidder. Ebay does not guarantee or administer the actual exchange of the item. It simply provides a medium through which a trade can take place. It is up to the buyer and the seller to complete the transaction once the auction has ended. Traders are allowed to post comments or complaints about one another. These comments are publicly accessible and therefore shape the reputations of the traders.

Ebay exacts a fee from the seller for listing the item and a commission based on the item's auction price. The buyer pays nothing to use Ebay.

Online auctions are limited by their reliance on text-based descriptions and by the cost of shipping.

While Ebay is turning a profit, its usefulness as an exchange mechanism is limited to a very narrow range of items—items that require very little information to describe and are shipped at little cost. Such items include small collectibles like Hummel figurines, and name-brand items like Coach leather goods. Because these items are easily described by their production number, name or form, and can be shipped cheaply, the number of buyers who can compete for them is vast as compared to that for large, cumbersome items that are difficult to describe and costly to transport.

For example, if one were to conduct a search on Ebay for the chair discussed above, he would be faced with several problems. The first would be choosing the keywords to best describe the item. The second problem is one of trust. Is the chair really as the seller has described? Has it been repaired? Is it comfortable etc.? Third, how much will it cost to ship it? Keep in mind that Ebay is globally accessible and the chair could be (and often is) hundreds of miles away. So what is the incentive of buying a chair through Ebay that cannot be physically inspected because of its distance or is interchangeable with chairs found locally that can be transported at little cost? There is none.

Online brokers have their limitations, especially those that handle decorative art, specialize in one category or range of items, and they cater to clients who desire such items. The information on their Websites is arranged according to the knowledge and expertise of their clients. An example is Circline.com, based in New York.

Circline.com is a broker site for very rare and expensive decorative art and antiques. It too requires users to enter text when searching for an object, but it does not face the same miscommunication problems between buyers and sellers that can occur in an auction setting. This is due to the high level of education and familiarity that Circline's clients have with stylistic terms. Buyers and sellers find one another quickly on Circline because they share a common understanding of how objects are described. Additionally, shipping costs are not of great concern because of the expense, rarity and desirability of the items.

Depending on their level of service, brokers administer every step of a transaction to varying degrees. Circline for instance fields all inquiries about the items for sale, arranges the payment schedule between the parties, handles the transportation and insurance, guarantees the satisfaction of the parties and protects the identity of the seller. This is done for a fee based on the listed price of the item.

Online brokers are useful only to a small portion of the population—those who have a cultivated knowledge of what they want and the financial resources to afford it.

Because their target audience has a high level of expertise, online brokers assume that their clients will be able to use text and keyword searches successfully when describing what they want. Online brokers are highly specialized entities and are not suited to meet the needs of the general public.

Storefronts are websites that are owned and operated by independent sellers of goods. Storefronts are usually nothing more than an online catalogue of inventories housed in one location—typically physical shops or warehouses. The inventories of decorative art and antique sites for instance are grouped by their form or use like tables and chairs, or more generally like bedroom and parlor furniture. Because the user has no way of specifying what he wants beyond the basic form of the item, he is forced to browse the entire inventory in the hope of finding something he likes.

Buyers are sent to different storefronts on the Internet through search engines. A search engine is nothing more than a service used to find information on the Internet. Search engines recommend different sites according to words or phrases entered by the user. If a user does not know the online address of a particular site, then he must locate the site through a search engine by using terms that describe what the user wants.

Storefronts allow buyers to browse the collections of many stores without having to leave home. Because the inventories can be viewed anywhere at any time, storefront sites have increased the sellers' market reach tremendously.

Finding a particular shop online is fairly simple, but locating a specific item is extremely difficult and time consuming. There is no way for a consumer to find what he wants on the Internet directly without first being sent through multiple layers of search. Once an item is found however, the cost to ship it may be prohibitive relative to its price and rarity in the market.

Online storefronts along with auctions and broker sites are depositories for the majority of saleable items on the Internet. They are all text based-meaning that if a buyer wishes to locate a particular item within the site he must enter keywords in order to specify what he wants. Unfortunately, as explained earlier, text is only useful when the desired item can be described with a few common or widely know terms. If a buyer is unable to articulate what he wants in the form of words, then his/her efforts to find that item on the internet will be futile?

The Internet currently offers consumers no alternative to text-based searches.

SUMMARY OF THE INVENTION

The invention is a new and unique online service that combines elements of item searching and trade facilitation. At its core is a visual search engine that represents a complete taxonomy of a class of uniquely designed items. The inventive system and methods abandon text as the primary search tool and allows consumers to identify what they want by choosing from a series of images—images that approximate the consumer's need.

The basic premise is that a shopper will have a mental picture of an item with enough specificity that he or she can describe the desired item based on picking from a palette of likely and distinctive images depicting the variations in a given item's attributes. By progressing through a step-wise process of narrowing down a search to a particular form (chair, table, sofa) and then type (arm chair, side chair) of furniture, the application will prompt the shopper to pick several visual attribute "Chips" from an interface we refer to as an Attribute Chooser. Other desired characteristics will be available for inclusion in the search filtration (e.g. dimensions, finish, etc.) in the form of traditional text entry boxes, drop-down menus, check boxes and radio buttons.

An example, if a buyer wished to purchase the chair discussed earlier, all he would have to do is select an image of that chair from among a visual catalogue of styles. The online service would then compare his selection to what was available for sale and present it on the screen. By relying on images rather than text, the service would not require consumers to know all the stylistic vocabulary necessary to describe such a chair. Furthermore, sellers would have an easier time listing their products on the service because they too would be able to catalogue their items using the same images. It follows then that both buyers and sellers would communicate more effectively because they would be using a common language of images instead of the subjective language of text.

Upon pressing search, the shopper is presented with thumbnails of matches, if any. Resultant thumbnails are clickable to reveal further item information and seller contact information. The application is not intended to broker transactions between buyers and sellers. It will generate revenue through charges it assess sellers to list items, sales of first-refusal rights to buyers seeking items matching a particular combination of descriptors, and sales of advertising space to relevant vendors, merchants and service providers.

Additionally, the service would take into consideration the physical location of the consumer and would identify the goods closest to where he lived. By doing so, the service would allow consumers to narrow their search to a few local shops. This would save consumers a great deal of time when ordinarily they would have to physically drive around town searching for what they wanted. Also by finding the item closest to where the consumer lived, the service would reduce the cost of transporting the item to the consumer's home.

A wish list and a right of first refusal on the website will draw the attention and gain critical support from the community of likely buyers, sellers and advertisers.

DETAILED DESCRIPTION OF THE INVENTION

Figure 1:
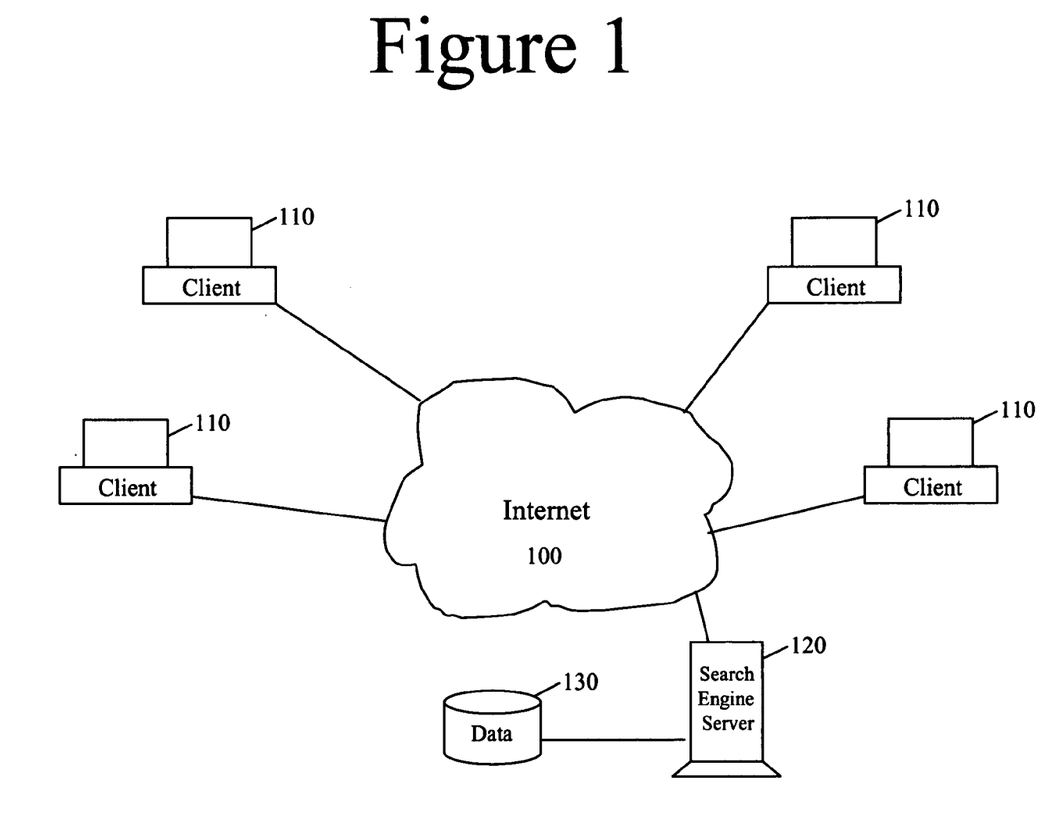
FIG. 1 is a schematic representation of a system for facilitating electronic commerce in uniquely designed articles.

The following is a description of is how the new service would work for a buyer searching for furniture. Referring to FIG. 1, the service is accessed over the internet 100 by a user via client 110. A search engine server 120 is located on a website that has an address. Search engine server 120 has a data repository 130 associated with it. A buyer logs onto the Internet 100 and enters the address of the website into the address field on his client computer screen.

Referring to FIG. 1, in a preferred embodiment of the invention a client computer 110 and search engine server 120 are connect to a wide area network such as the Internet 100. The client computer 100 causes a software program that may reside in search engine server 120 to communicate with data repository 130. Both buyers and sellers use the client computers 110 for imputing items for sell or for buyer's inquiries as to items available in the data repository 130.

Site visitors will not be required to create a public account to use the site—if site visitors wish to try the site without identifying themselves, they may do so by designating their zip code. The indicated zip code will be stored in a session variable and can be stored in a permanent cookie; otherwise the user must re-enter their zip code when they begin their next session. This group is referred to above as casual shoppers. Others in the general public audience container create user accounts in order to realize other benefits of the search service and to list items.

Once zip code is known, search results and advertisements are contextual to it, although in certain interfaces, the circumference of the search area around the site visitor's zip code can be altered to broaden or narrow search and advertiser result listings. The website only uses the account holder's self-classification to ascertain audience demographic statistics and formulate marketing strategies.

Figure 2:
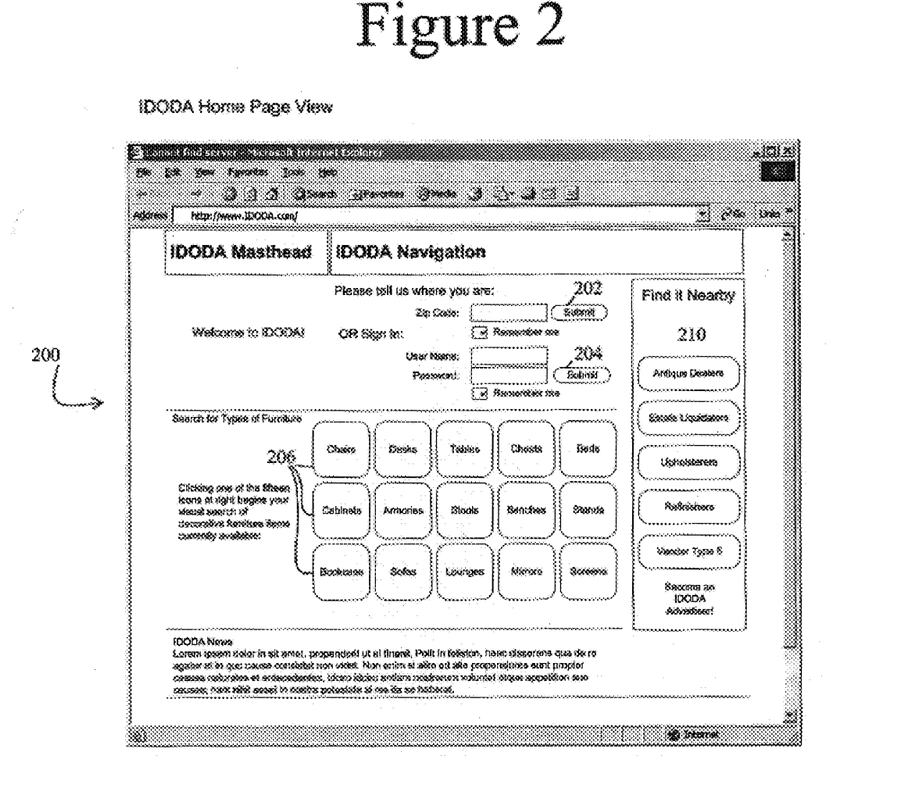
FIG. 2 illustrates a screen display of a web home page.

A welcoming home page 200 appears as shown in FIG. 2. The site asks the buyer if he is a buyer or a seller and where he is located. His location can be determined from his zip code entry 202. The person selects "buyer" and enters his zip code. A buyer may have an established account having a user name and password which is submitted through button 204. The buyer is then asked what is the general form of the item he is looking for—table, chair, desk, mirror etc. in section 206. Once the form has been chosen, the buyer is shown a main search screen shown in FIG. 4 that is separated into distinct fields or menus.

Figure 4:
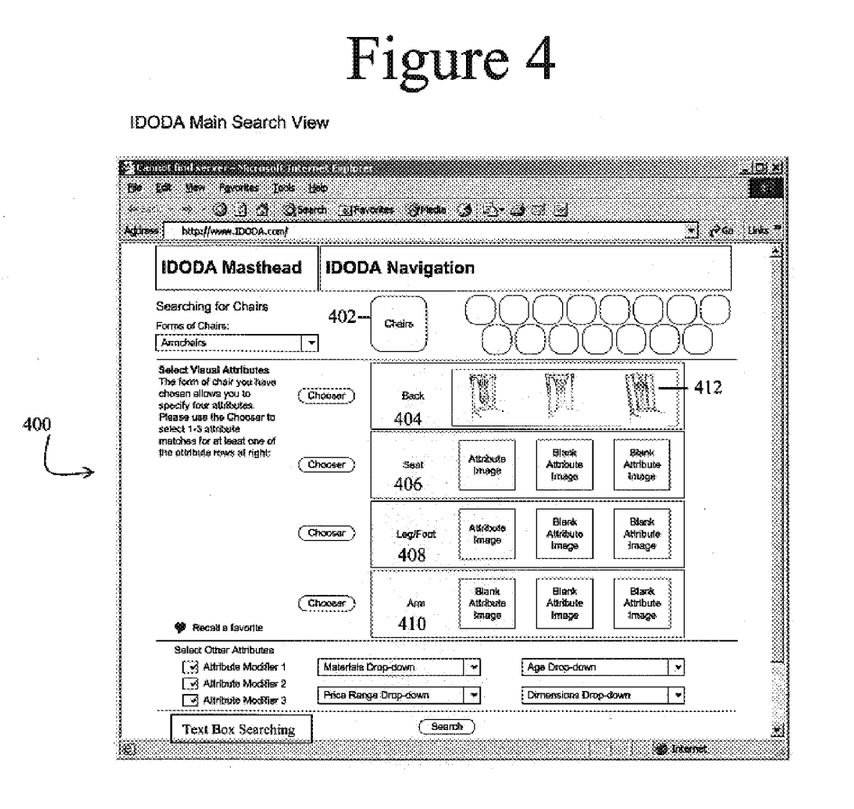
FIG. 4 illustrates a screen display of a main search page.
Figure 5:
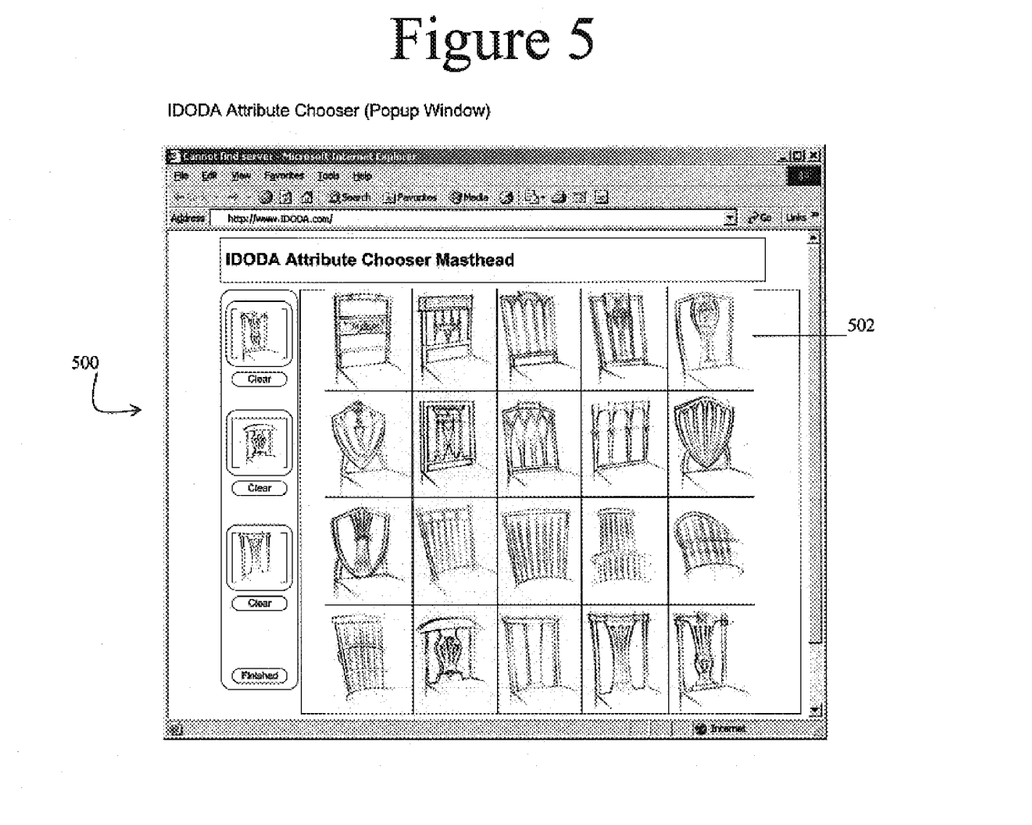
FIG. 5 illustrates a screen display for attribute choosing.

Each menu corresponds to a particular physical characteristic found on the furniture form the buyer has chosen. The menus for a chair 402, for example, would include back 404, seat 406, leg/foot 408 and arm 410. Each menu contains stylized sketches of all possible examples 412 of each characteristic. For instance, square seats, round seats, slip seats; shaped seats etc. are all shown in pictures. Shown in FIG. 5 is the screen display 550 containing chair backs 502 that represent all possible examples of backs of chair. The buyer then chooses the type of seat he wants, and so on. Once the buyer has chosen all the desired characteristics for his item, the service searches its database and chooses the items that match the buyer's choices. The attribute selected the closer the buyer will come to his desired selection.

Figure 3:
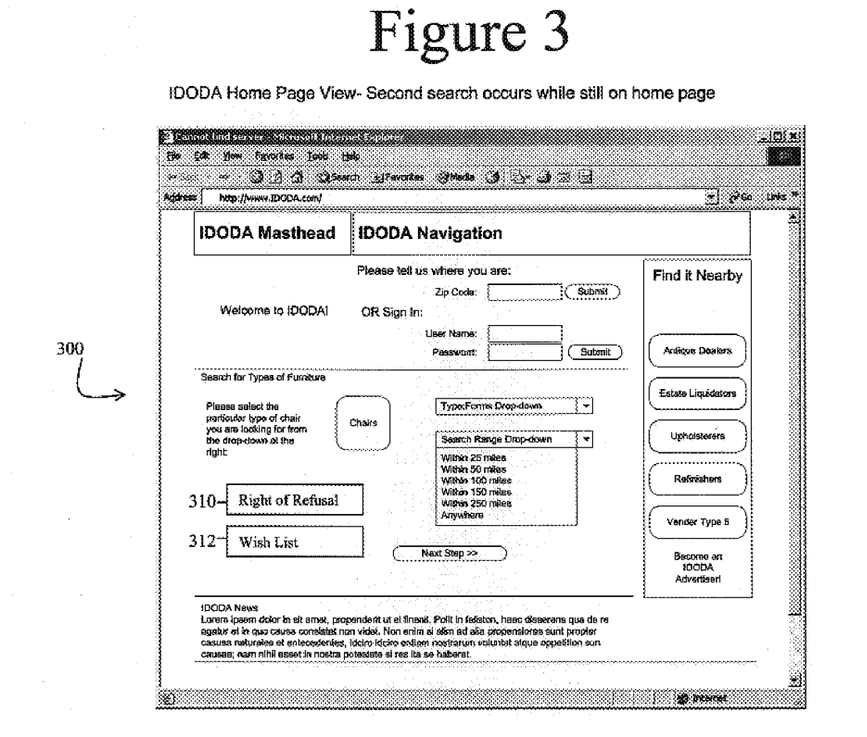
FIG. 3 illustrates a screen display of second web home page.
Figure 6:
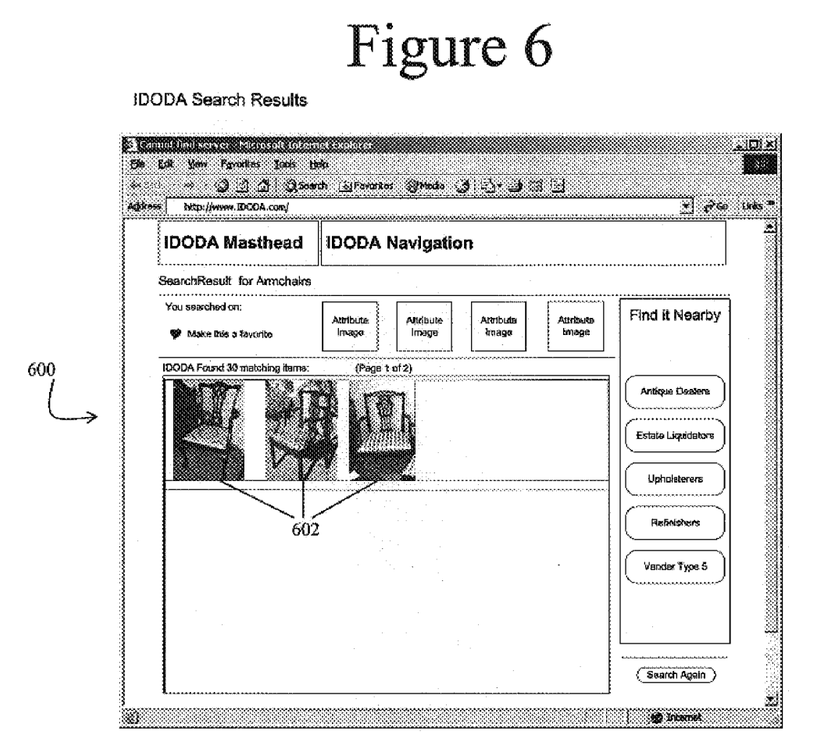
FIG. 6 illustrates a screen display results from a search request.

Of those items, the service shows first the one that is located closest geographically to the buyer according to his zip code. The acceptable range of search range was presented and selected by buyer in the home page view 300 shown in FIG. 3. The buyer then views all the options presented as a result of the search and choose the one he likes the most. Typical search results 602 are shown as screen display 600 in FIG. 6. The search can be further refined and run again.

Figure 7:
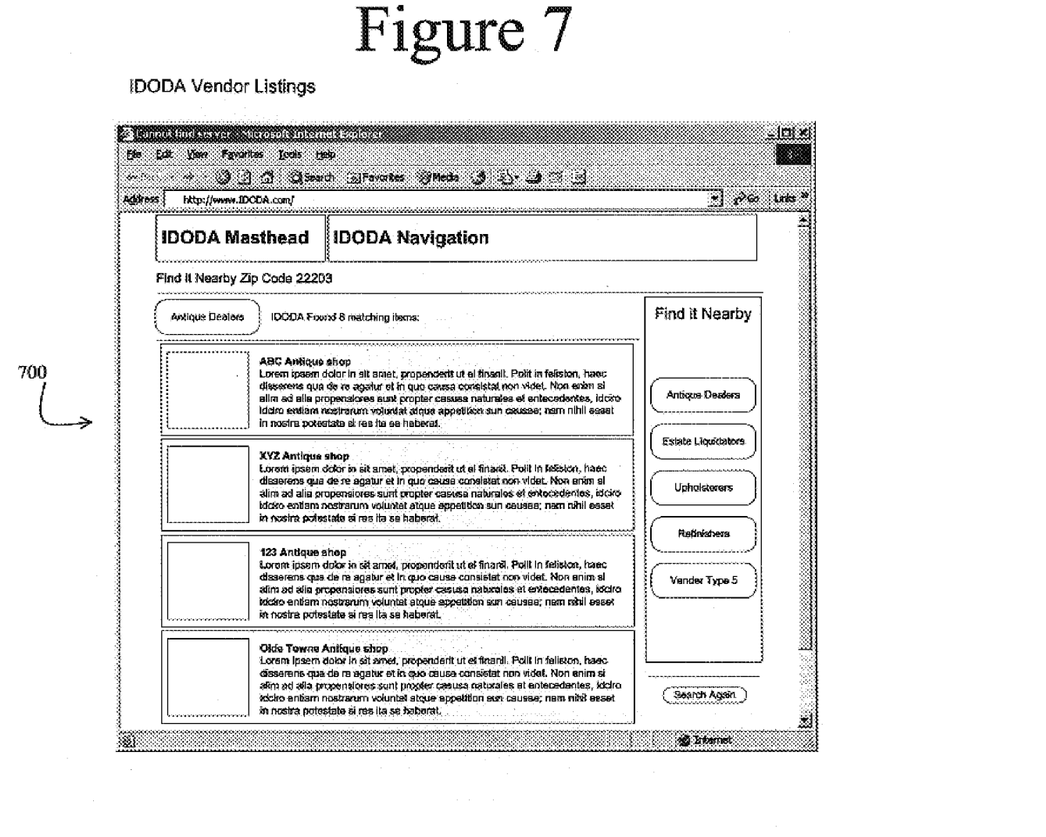
FIG. 7 illustrates a screen display of vendor listings.
Figure 8:
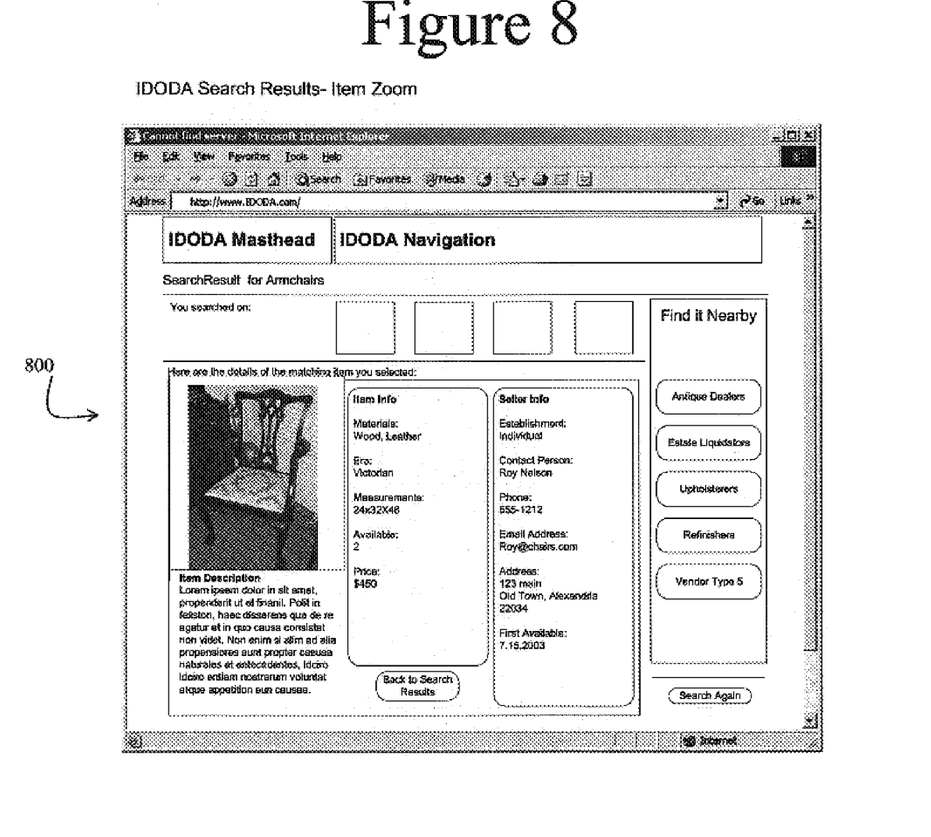
FIG. 8 illustrates a screen display of detailed item selection.

Upon finding a match, the buyer is given a full description of the item. This description shown in screen display 800 of FIG. 8 includes information on who owns the chair, where it is and its cost, as well as any notes the sellers chose to include. The buyer is then left to decide whether or not to contact the seller. The seller is listed in screen display 700 shown in FIG. 7 which shows a vendor listing of eight matches.

An example of how the service would work for a seller follows. The Seller logs onto the Internet and goes to the service just as the buyer does. He is asked if he is a buyer or seller. See FIG. 2 for home page view. He chooses "seller" and is prompted to give his account number or establish an account so that the service can identify him and the location of the item being sold. It then asks what is the general form of the item he wishes to sell—table chair, etc. In this case he chooses "chair". Once the form has been chosen, the seller is shown the same screen for chairs that the buyer was shown previously. It is broken into the same menus that correspond to the different physical characteristics found on chairs. The seller chooses from among the images shown in each menu until he has chosen all the characteristics that match the chair he wishes to sell. The seller is then prompted to "upload" an image of his chair to the service along with any notes or messages he would like to add. This is done electronically and is well know in the art. It is nothing more than sending a file of the image like one would send an e-mail message. The only special equipment needed is a digital camera or scanner—both widely available and affordable. Once the image is uploaded, the service attaches the image to the visual characteristics chosen by the seller. The image is stored by the service through the search engine server 120 onto data repository 130. The data is made available according to how much time, the number of hits or the other service fee arrangement the seller has paid for. Because the seller has already entered his account information, the service can identify him to any buyers who may inquire about his chair and can bill him for the service.

Advertiser audience members hold a different account from general site users, and may be provided a separate URL (such as ads.IDODA.com) for signing in, in the interest of keeping their site traffic somewhat separate from the regular site. This separation is also being used instead of merging advertisers with general public accounts because it is not expected that advertisers will typically be running listings or shopping, other than to observe how their ads appear in context. Advertisements appear on the home page screen displays shown in FIGS. 2 and 3 as well as on search results screen displays shown in FIGS. 6, 7 and 8.

Advertisers' accounts will be recorded in the same table as regular user accounts, but with a flag marking their records as being advertiser accounts. The account behaves as any other user account, otherwise. But when an advertiser logs in, he or she is presented with an additional navigational element allowing him or her to review their ad performance, upgrade or renew their ad.

Ads appear in the "Find it Nearby" section 210 of the website. Ads that are displayed are selected based on the zipcode of the user interacting with the site. Among those selected, Advertisers can buy prominence in four ways. The most basic way is to have their listing boldfaced. The second most prominent is to have their ad boldfaced and highlighted. The third is to have their ad featured—this causes it to bubble to the top of the list for a given vendor type. The fourth way is buy one or more zip codes. This supercedes even featured status. Only one advertiser can "own" a given zip code at a time, and so if a certain zip code is reckoned as desirable by more than one advertiser, their time in that spot is a wait-list consideration that the website must manage.

So if User A is browsing Find it Nearby ads, all possible Advertisers are culled within a ceiling distance to be still considered nearby, presumably no more than 200 miles. Then of these Advertisers, the System must determine if any of these bought the zip code that User A is from and show that one first. Next, the System must consider the circumferences that each advertiser bought and find which Advertisers overlap User A's center. The diagram below illustrates how an advertiser that is within the bounds of User A's maximum range may not show because that advertiser opted for a narrow range, while two others with wider ranges manage to overlap User A's center and are therefore included among Advertisers displayed in their vendor classification in Find It Nearby:

Advertisers can maintain more than one graphic for their ad and manually change which shows when they log in, or they may opt to let the website administrator rotate as many as they have uploaded (up to 10) randomly to try to catch the user's eye with variance. When an Advertiser runs an ad, it is referred to as an Ad Run and the advertiser is asked to assign a name to it. When an ad run expires, the Advertiser can renew the ad, but it is replicated and the user is asked to provide a new name for the Ad Run.

Administrators can manage advertiser accounts separately from regular user accounts and perform a number of reporting functions to gauge advertising volume over time and future advertising volume based on ad booking.

This will follow industry standard baseline Administrator permission scenario whereby tagging an administrative account as Supervisor will assign permission to all available administrative utilities; otherwise, the Administrator is considered Junior and may have access to some or all administrative tools, but each is switched on or off individually by and Administrator who is a Supervisor.

The website will be built using a content management system (CMS) that allows site Administrators to create new content areas, hide or schedule content live and expire times, and create non-hierarchical content that can appear in one or more sections of the site. A content management System enforces a high degree of uniformity in the site and governs layout and navigation such that the site should never have broken links or wide variance in the appearance of content, as is often the case with generation one, HTML-based sites.

Part of the basic functioning of the CMS is to allow Administrators to create new administrative delegates who may use some or all of the administrative extranet tools to participate in the management of site information or to obtain reports. The Administrative interface is organized such that related tools are accessed via a tabbed interface with a group label on each tab. When an administrative user logs in, only those tabs that contain permitted admin functions appear, and on each tab, only the permitted functions. The pilot implementation of the CMS extranet will have a binary Administrator role treatment whereby if an administrative user is designated to be in a Supervisor role, he or she automatically has full access to all administrative tools. Otherwise, he or she is by default a junior administrative user and will have access to some subset of administrative tools arbitrated by the supervisory administrative user who created the junior account.

Access to administrative tools is a binary consideration for junior administrative users, whereby if the tool is permitted, the full range of its functionality is allowed.

Figure 9:
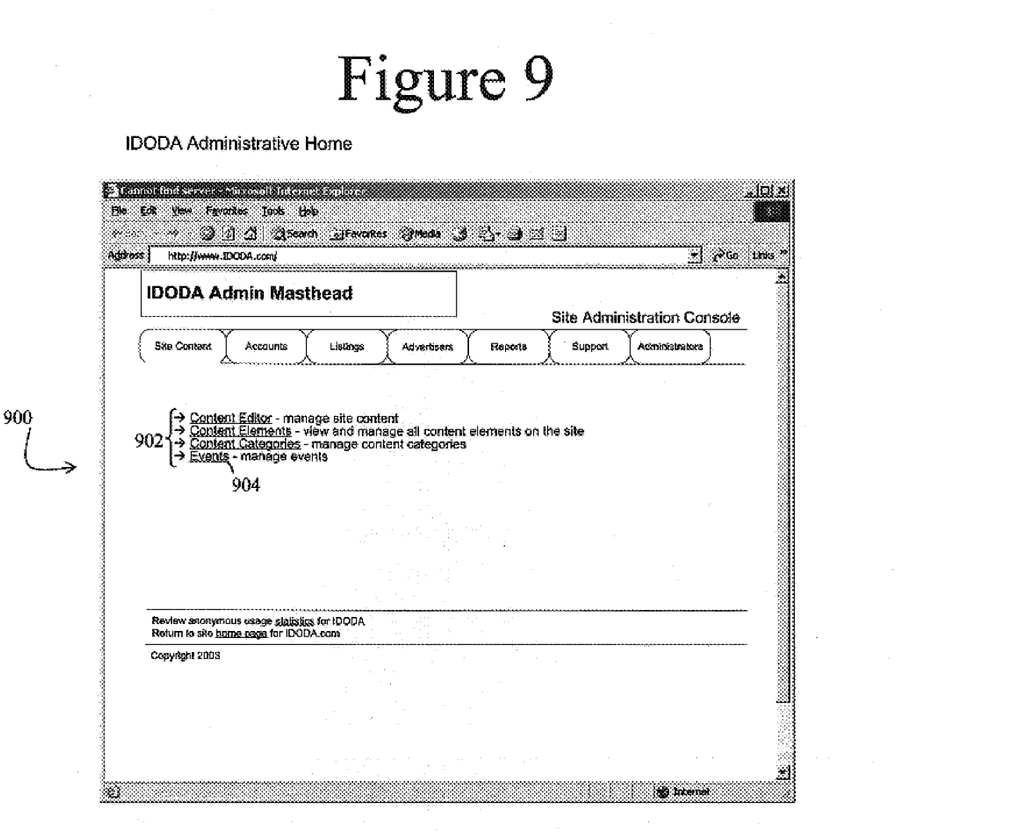
FIG. 9 illustrates a screen display for administrative selections.

Functions list feature 902 description because of the auctions and other selling events that take place in the decorative furniture industry, the website owner wishes to include a calendar of events feature 904. This construct allows the website to generate more content volatility and therefore create more reasons for users to visit frequently. It also is another potential use for fee generation by allowing both regular users and advertisers a means to publicize their upcoming events.

The administrators of the site can populate the calendar from the administrative extranet using an admin utility provided for the task as shown in FIG. 9. When Administrators post events, they can flag them as website owner events. This means that they are put on or otherwise organized by website team members. When they appear on the public side of the site, they are treated with website branding so that they stand out from other events. If this flag is not checked, the event is posted as though it had been submitted by a public user.

Other than website administrators posting calendar content, the calendar is populated by users posting event content from their account area of the site. Here they can opt-in to be notified when new events are posted, and/or pay a flat fee in to add a listing the website calendar.

Each listing will have a beginning and end date, full address, cost, and fields for the user to indicated point of contact, phone number, email address and URL to the site, if any. The user can enter an event name and brief text description of the event before submitting for posting. The user can opt to be credited with posting the event. If they do, their website member name will also appear in the event listing.

Each item posted will be subject to review by a website administrator in the site pilot, before it is published to the public. When the events are accepted by website administrators, they immediately appear on the public site in the calendar section. Links to event sites will spawn a new browser.

Figure 10:
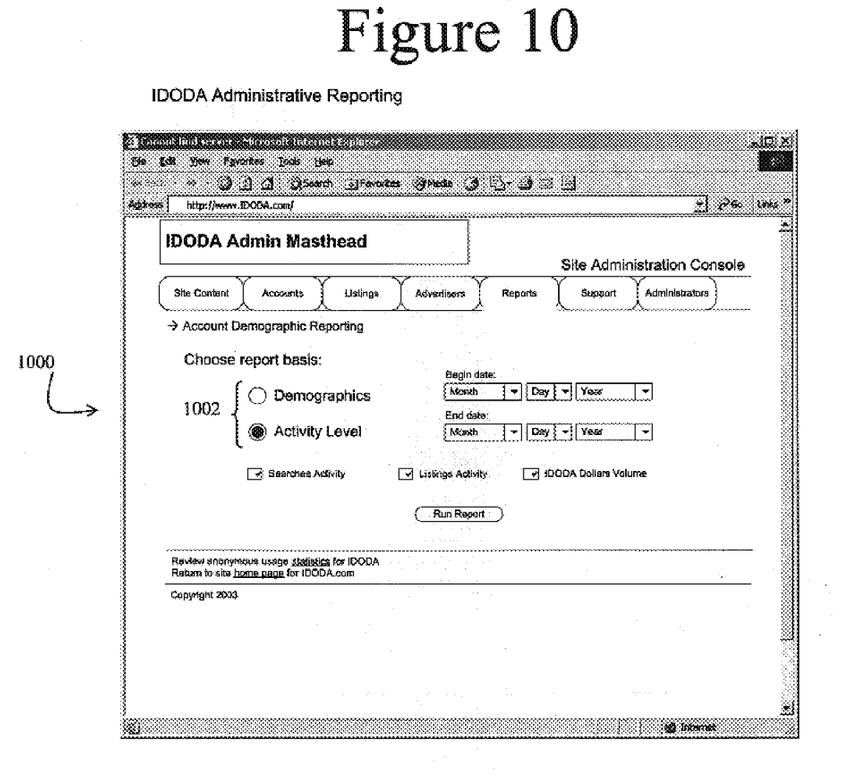
FIG. 10 illustrates a screen display of administrative reporting.
Figure 11:
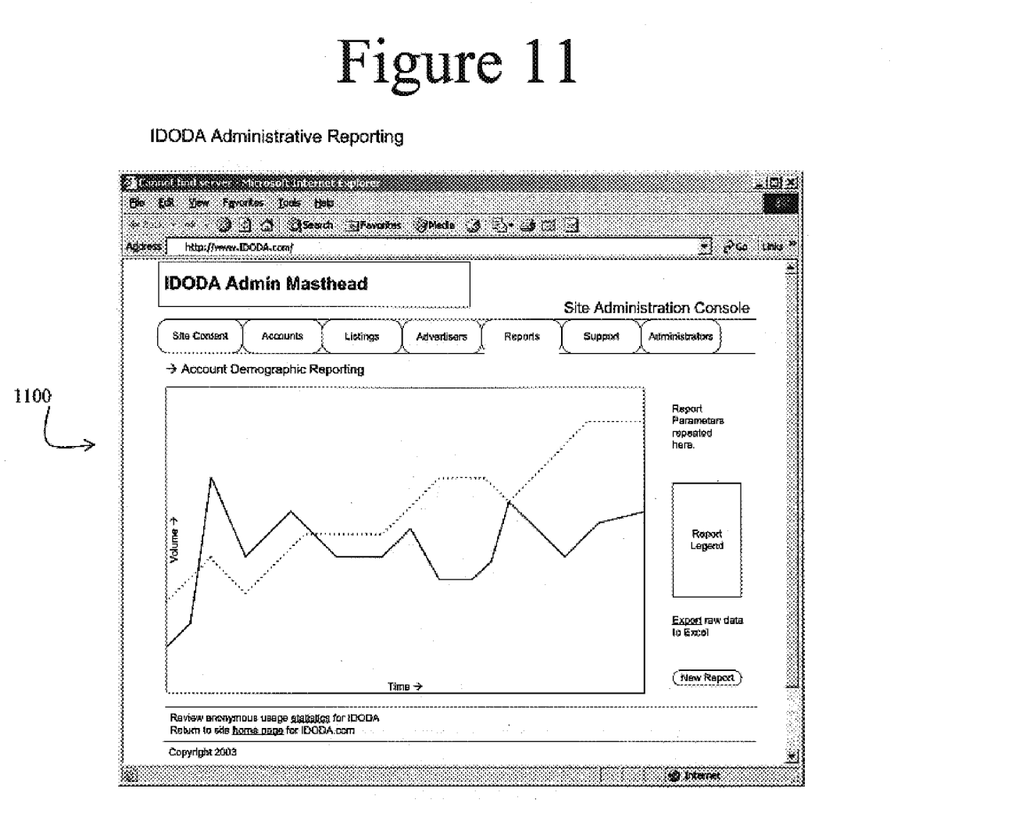
FIG. 11 illustrates a second screen display of administrative reporting.

Functions list content classification standards since the website will utilize a content management system in order to arrange information, we classify content as being one or the other of two types. The first is Hierarchical, or Primary content. This content is organized into a taxonomy of containership. Each content item can accommodate a reference to an interactive element that appears in the primary content are of the site. The underlying assumption of primary content is that no two content items repeat—each is unique. The other type of content classification is referred to as content elements. These are also each unique, but exist independently of the primary content hierarchy. These content items may repeat within the site and are used by associating each content element Reports can be run by the administrators on demographics or activity level 1002 as shown in screen display 1000 FIG. 10. In FIG. 11, the screen display 110 shows volume plotted over time by website administration.

Figure 12:
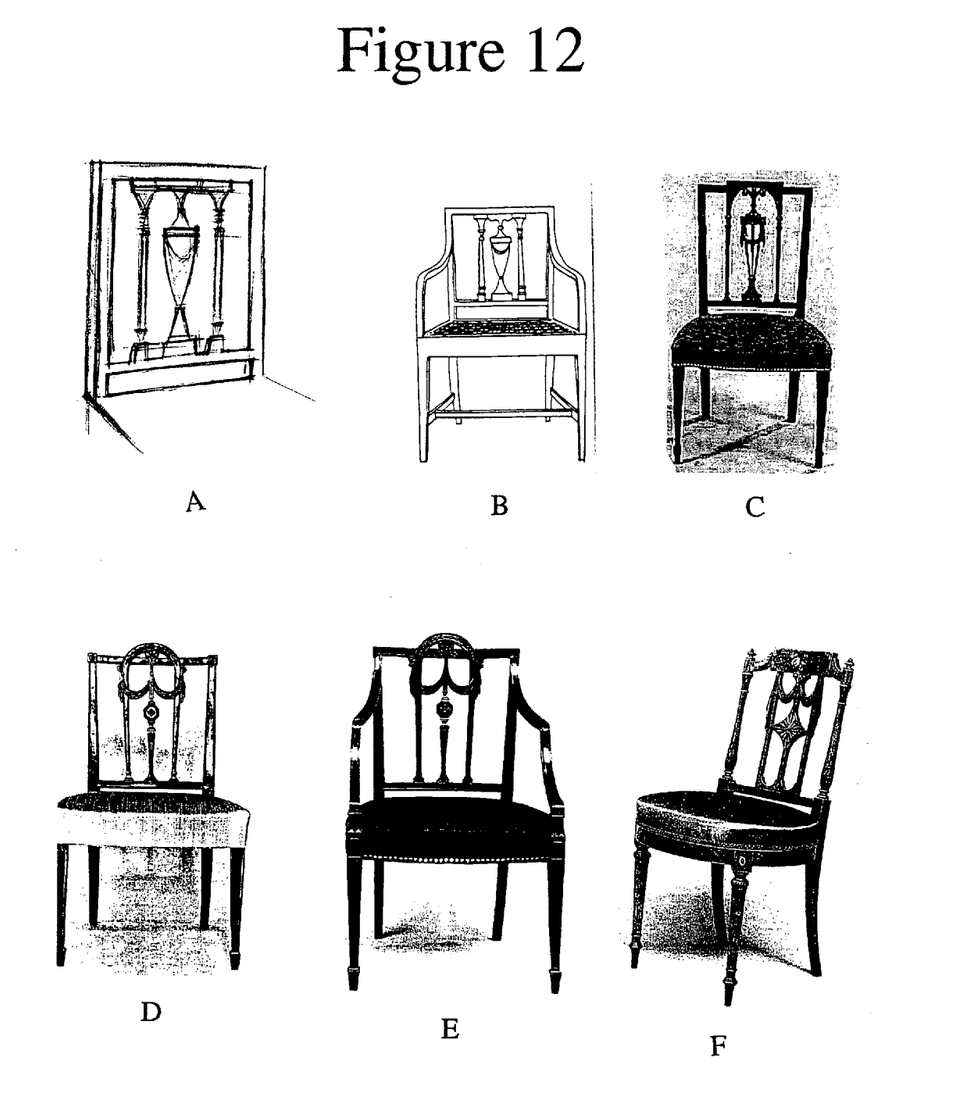
FIG. 12 shows an approximate interpretation of a desired attribute feature.

One of the key features of the present invention is the graphical taxonomy used for the website application. To be manageable within the context of an internet search, a simply alphabet was created to describing in images an infinite range of stylistic combinations. As illustrated in FIG.

12, the chooser attribute labeled "A" is one of the backs available for selection in the screen display shown in FIG. 5. This constitutes a schematic representation of a real object shown as "B" in FIG. 12. Also in the mind's eye is an approximate interpretation of objects "C", "D", "E", and "F". This simplification allows each component part of an object to be approximated by about 40 or so wire form sketches.

The present invention allows for the inclusion of relevant physical characteristics about the unique items listed, such as the physical dimensions of the item as shown in FIG. 4 such as dimensions, price range of interest, materials of construction, age. Also a separate Text Box Searching feature can be made available, element 414. The text box searching can be used to match with the sellers listed description of the item for sale. These features allow the size, age and actual dimension of an item to be a searchable field, which is important and not be easily ascertained by viewing image files of an object.

There are several advantages of this service over other services. This service represents the next step in a logical progression of Internet shopping. It builds upon the success of current electronic commerce models, but goes one step further by abandoning the use of text as a search tool. It relies on consumers' natural ability to identify what they want visually rather than forcing them to describe it with words.

More importantly it allows for mass-customization of information based on the consumer's geographic location. It will allow consumers to locate vendors within their region who can cater to their needs.

This service model can become the portal for any industry that deals in products that are difficult to describe and are desirable only in local markets due to transportation costs.

Uses of this inventive service are many. Because this service uses images rather than text to identify consumer goods, it is accessible to a wide range of users regardless of their education or knowledge of descriptive terms. In addition, the service's ability to customize information makes it a desirable advertising medium for all vendors who wish to target their local markets.

The use of images rather than text to guide the consumer though a selection process is a applicable for a variety of industries. Such industries would include the Antiques Industry, the Design Industry, the Furniture Industry, the Textile Industry, the Building Industry, Consumer Behavior Researchers, the Jewelry Industry, and the Clothing Industry. Virtually any industry that is dependent on the consumer's ability to visualize what they want Fees can be charged for the service. Given the versatility of this service it will be attractive to a wide range of users who wish to add their list or advertise their goods and services on the site. Naturally the service will exact a fee for this.

There are three potential sources for revenue from such a service. A listing fee will be charged to anyone wishing to place their wares for sale on the service. It will be determined by the number of items listed and the duration of their listing. Ebay currently charges a flat listing fee, but charges extra for options that make the item stand out among others like bold text and its ranking on the buyers search results. Similar options can be made available on this service as well.

A fee per search could be charged to the seller every time his item is found in a search. Of course the fee would not exceed a given amount to protect sellers of highly desirable items from paying more than should be expected.

An advertising fee can be charged given the service's ability to track buyers and sellers according to their location, this information can be used to match local advertisers with their target markets. Using the decorative art market for example, if a buyer locates a chair that is in a shop 20 miles away, not only will service give him the name and address of the shop, it will also recommend vendors in the area who can refinish it, reupholster it and transport it. These vendors will be required to register for a fee with the service if they are to receive referrals from it.

Additional fee generating features are the right of first refusal which buyers could purchase. This is shown as element 310 on FIG. 3. Buying this right affords the buyer the advantage of being notified of an item matching stored search criteria with a time limit, say 48 hours, lead time over any other website buyer who simply has the same search as a stored wish list. Stored wish list 312, is a service that may be fee based for providing a search request on the website that is run periodically, or run upon the uploading of seller content.

While the invention has been described for use as a search function to consumers of furniture over the Internet, it is to be understood that the invention may be used in many other settings without limitation such as Antiques Industry, the Design Industry, the Furniture Industry, the Textile Industry, the Building Industry, Consumer Behavior Researchers, the Jewelry Industry, and the Clothing Industry. Virtually any industry that is dependent on the consumer's ability to visualize what they want. Changes may be made within the purview of the appended claims without departing from the true scope and spirit of the invention in its broader aspects

What is claimed is:

1. A system for providing aggregation of buyers and sellers over the internet comprising:
    a self-contained graphical pairing method employing a database running on a computer server for storing existing items offered by sellers or desired by buyers over the internet:
    a graphical reference library resident in the graphical pairing method for use by the sellers and the buyers for listing and search existing items, the library comprising a graphical alphabet of component parts of existing items to be listed, the alphabet comprised of graphics drawn to generally represent stylistic differences of design of existing items;
    each graphic being a representation of a stylist component and not a drawing of an exact or existing component, said individual graphic used to represent variations of itself including nuances;
    search means for use by buyers over the internet for locating desired existing items listed by sellers through use of the graphical reference alphabet;
    to thereby aggregate buyers and sellers of existing items through online internet communication.

2. The system of claim 1 wherein the graphical reference library contains an alphabet of limited number of styles representative of a plurality of stylistic combinations of existing items.

3. The system of claim 1 wherein buyers and sellers are aggregated according to geographical location.

4. The system of claim 1 wherein geographic location information of buyers and sellers is determined by zip code.

5. The system of claim 1 wherein advertisements bearing a geographical relationship to a buyer, a seller or the location of a existing item are presented to the buyer.

6. The system of claim 1 wherein the sellers place relevant physical information of a existing item including dimensions, age, or materials of construction as part of their listing.

7. The system of claim 6 wherein additional information is given regarding the price or condition of a existing item.

8. The system of claim 1 having a text based searching capability in addition to the graphical search engine.

9. A method for aggregating buyers and sellers of existing items over the internet comprising the steps of:

sellers and buyers using a graphical reference library resident in a self-contained graphical pairing method in a database running on a computer server for listing images of existing items for sale by sellers and desired by buyers over the internet, the graphical reference library comprising a finite number of graphical icons drawn to generally represent variations physical component parts of existing items to be listed;

listing content of existing items for sale by sellers and desired by buyers online on the internet by sellers and buyers of designs, furnishings and accessories including relevant physical characteristics of the existing items for sale or desired by using the graphical reference library having a graphical alphabet of component parts;

matching images of existing items listed for sale by sellers to those images of items desired by buyers by pairing the graphical icons selected by the sellers and the buyers to represent the physical components of the offered items and desired items;

locating sellers closest to buyers, thereby aggregating buyers and sellers of existing items through online internet communication.

10. The method of claim 9 wherein the graphical reference library contains an alphabet of a limited number of styles that are representative of a plurality of stylistic combinations of existing items.

11. The method of claim 9 wherein buyers and sellers are aggregated according to geographical location.

12. The method of claim 11 wherein geographic location of buyers and seller is determined by zip code.

13. The method of claim 9 wherein advertisements bearing a geographical relationship to a buyer, a seller or the location of a existing item are presented to the buyer.

14. The method of claim 9 wherein the relevant physical information of a existing item includes dimensions, age, or material of construction.

15. The method of claim 14 wherein additional information regarding a existing item is presented to a buyer including price and physical condition of the item.

16. The method of claim 9 having text based searching in addition to the graphical searching.

17. A computer program embodied in a computer-readable medium and executable by a computer processor, said program comprising instructions to:

access a self-contained graphical pairing method employing a database running on a computer server for storing images of existing items offered by sellers and desired by buyers over the internet;

access a graphical reference library resident in the graphical pairing method, the library comprising a finite number of graphical icons drawn to generally represent variations of physical component parts of existing items to be listed;

list, via use of the graphical reference library having a graphical alphabet of component parts representing graphical icons, existing items online on the internet offered by sellers and desired by buyers of designs, furnishings and accessories including relevant physical characteristics of the existing items for sale;

online matching of images of items offered by sellers to those images of items desired by buyers by pairing the graphical icons selected by the sellers and the buyers to represent the physical components of the offered items and desired items;

locating sellers closest to buyers, displaying the results of an online search by sellers and buyers to match the existing items offered by sellers to those desired by buyers through internet communication.

18. The computer program of claim 17 wherein the graphical library contains an alphabet of limited number of styles representative of plurality of stylistic combinations of existing items.

19. The computer program of claim 17 wherein geographical location information of buyers and sellers is aggregated as determined by zip code.

20. The computer program of claim 17 wherein additional relevant information regarding a existing item is presented including dimensions, age, material of construction, price and condition.

21. The computer program of claim 17 having text base searching in addition to the graphical searching.

\* \* \* \* \*